(12) United States Patent
Paulsen et al.

(10) Patent No.: US 7,191,642 B2
(45) Date of Patent: Mar. 20, 2007

(54) METHOD, APPARATUS AND SYSTEM FOR MEASURING BRAKE FORCE

(76) Inventors: Craig A. Paulsen, 1350 Monte Vista Dr., Reno, NV (US) 89511-9409; Phil L. Perry, 7185 Nicolaus Rd., Lincoln, CA (US) 95648

( * ) Notice: Subject to any disclaimer, the term of this patent is extended or adjusted under 35 U.S.C. 154(b) by 0 days.

(21) Appl. No.: 10/932,588

(22) Filed: Sep. 1, 2004

(65) Prior Publication Data

US 2005/0172706 A1    Aug. 11, 2005

Related U.S. Application Data

(60) Provisional application No. 60/543,384, filed on Feb. 10, 2004.

(51) Int. Cl.
*G01L 3/26* (2006.01)
(52) U.S. Cl. .............................. 73/121; 73/130; 73/132
(58) Field of Classification Search ............ 73/121–132
See application file for complete search history.

(56) References Cited

U.S. PATENT DOCUMENTS

| | | | | |
|---|---|---|---|---|
| 5,305,636 A | * | 4/1994 | Balsarotti et al. | ............. 73/122 |
| 5,410,911 A | * | 5/1995 | Severinsson | ................. 73/128 |
| 6,188,948 B1 | * | 2/2001 | Shivler, Jr. | .................... 701/76 |
| 6,634,208 B2 | * | 10/2003 | Salou et al. | ............... 73/11.07 |
| 6,701,780 B2 | * | 3/2004 | Hofmann et al. | ............. 73/146 |

* cited by examiner

*Primary Examiner*—Edward Lefkowitz
*Assistant Examiner*—Jermaine Jenkins
(74) *Attorney, Agent, or Firm*—Weide & Miller, Ltd.

(57) ABSTRACT

A brake force measurement system comprises at least one sensor configured to generate an output indicative of a force applied by to a first braking member associated with a rotatable wheel of a vehicle by a second braking member. The second braking member may be an actual brake pad or a substitute pad plate or member. In one embodiment, the sensor is a load cell configured to measure force applied by the pad or substitute pad member to a rotor of a brake mechanism associated with each wheel of the vehicle. In one embodiment, the sensor output is input to a processing unit configured to display brake force information in human-readable form, such as by an alpha-numeric display displaying brake force at each wheel in various units of measure or percentage of brake force at one or more wheels.

16 Claims, 6 Drawing Sheets

METHOD, APPARATUS AND SYSTEM FOR MEASURING BRAKE FORCE

RELATED INVENTION

The present invention claims priority to U.S. Provisional Patent Application Ser. No. 60/543,384, filed Feb. 10, 2004.

FIELD OF THE INVENTION

The present invention relates to brake systems. More particularly, the invention relates to a method and apparatus for measuring, outputting information regarding, and adjusting, generated brake force.

BACKGROUND OF THE INVENTION

Hydraulic brake systems in high performance or race vehicles utilize either dual master cylinders or a production-style tandem master cylinder. Tandem master cylinders use one cylinder bore with two pressure ports and pistons. They are designed so that if pressure is lost in either port, the other port maintains its pressure. Dual master cylinder set-ups completely isolate the two hydraulic systems. One system connects to the front wheels, while the other connects to the rear wheels. Whichever method is utilized, dual brake systems will still provide braking force from one system even if the other one completely loses pressure.

There are several options available when choosing a performance brake system, including, among other things, different brake pad compounds, rotors of various sizes and weights, calipers with different piston sizes, and the ability to change the bore size of a master cylinder.

With so many variables involved with proper brake tuning, race teams have begun to realize that many spring, shock, sway bar, and chassis weight adjustments can be eliminated with a small adjustment to the brake system.

Changes brought to a car when brakes are applied include deceleration drag on the driveline from the engine, weight transfer from rear to front and side to side, and stress on tires. It is imperative, given those variables, that a brake system be properly balanced, in order to minimize the shock that is delivered to a chassis. If not, corner handling will be lost and the driver's comfort and concentration will be compromised.

Improperly tuned brakes can create handling problems. Heat, in particular, can cause problems. On tracks where braking is critical, heat can boost front tire pressures and decrease handling performance, leading to slower lap times and inconsistent performance.

An important objective when tuning the chassis with brakes is having the right amount of front-to-rear brake bias in the car. Brake bias is defined as the total braking force distributed between the front and rear tires expressed as a percentage. A 70–30 bias split from front to rear is a general guideline for oval track racing on asphalt. Dirt track racing, road racing and varying track conditions on any type of track, can lead to different split requirements. The range can vary from as high as 75–25 down to 58–42, with 70–30 bias split being a baseline figure.

Many factors affect the amount of braking force a tire can generate. The most important one is the force (weight, downforce, etc.) pushing the tire against the ground. As a car decelerates, weight is transferred from the rear to the front tires. This weight transfer reduces the amount of braking force the rear tires can produce. Application of too much brake force to the rear wheels will cause lock-up, causing the rear end to lose traction and possibly swing around violently.

When entering a corner, 60 to 80% of the weight is transferred to the front of the car. The exact amount of weight shift depends on the speed of the car, track, corner, and how much brake is applied upon entry. Because of these varying factors, more or less front brake needs to be "dialed" into the car.

As a means for controlling the amount of brake force which is applied at the front and rear wheels of the car when the brakes are applied, a balance bar may be utilized. A balance bar is positioned between the front and rear master cylinders. The position of the bar can be adjusted to allow more or less brake pressure to be applied towards the front when the brake pedal is pushed.

In general, the balance bar is an adjustable lever (usually a threaded rod), that pivots on a spherical bearing and connects to the two separate master cylinders for the front and rear brakes. Most balance bars are part of a pedal assembly that also provides a mounting for the master cylinders. When the balance bar is centered, it pushes equally on both master cylinders creating equal pressure, given that the master cylinders are the same size bore. When adjusted as far as possible toward one master cylinder, it will push approximately twice as hard on that cylinder as the other.

The driver can adjust the balance bar before, after or during a race, or practice sessions, to change the precise adjustment of the front to rear bias setting, allowing for changing track conditions or to optimize brake performance. The correct front brake bias setting depends on the driver's driving style and how hard or how much the brakes are used getting into a corner. Since this will vary with each corner at each track, it is important to find the right balance as not to upset the chassis when the brakes are applied while cornering.

Unfortunately, the balance bar is only a simple mechanism for comparatively changing the amount of brake force which is applied to the front and rear wheels. The balance bar does not ensure that the proper amount of braking force is applied.

Besides the above described factors affecting brake force, the configurations of the various brake system components affect brake force. For example, it is well known that mechanical parts have manufacturing tolerances whereby "identical" parts may be physically larger or smaller but still within an acceptable range. Brake calipers, brake pads, brake rotors, brake mounting components and related parts all experience this issue. In addition, the piston seals used in brake calipers offer different resistance levels to piston movement in the caliper due to the manufactured piston and bore tolerances. It is desirable, for maximum performance, to have all four brake calipers operating in a consistent manner with the same characteristics.

In an effort to find "balanced" sets of calipers that have the same performance characteristics, many auto race teams and brake caliper manufacturers measure the hydraulic pressure required to operate the caliper. Calipers that fall within an acceptable range are designated as matched sets and are used on race vehicles to enhance that vehicle's braking performance. Other brake system components can also contribute to an unbalanced system, including master cylinder and mechanical pedal variations along with other mechanical mounting variations of system components.

As one attempt to determine braking force, some prior art methods utilize hydraulic line gauges. These gauges measure brake line pressure. This manner of attempting to determine brake force suffers from several disadvantages. First, the gauges are not highly accurate and repeatable.

Further, the hydraulic line pressure gauges only measure the brake line pressure to establish or record vehicle brake bias settings. Because brake line pressure is only a measurement of the force applied behind the caliper pistons, the line pressure has to be multiplied by the total area of the caliper pistons as one factor in determining clamping force on the rotor. This is a difficult task. Further, as indicated above, other factors may affect the actual braking or clamping force.

Various objects, features, and advantages of the present invention over the prior art will become apparent from the detailed description of the drawings which follows, when considered with the attached figures.

SUMMARY OF THE INVENTION

The present invention is a brake force measurement system, method and apparatus. In one embodiment, a vehicle braking mechanism comprises a first braking member associated with a rotatable wheel of a vehicle and a second braking member configured to move in and out of contact with the first braking member, the second braking member when in contact with the first braking member inhibiting the rotation of the rotatable wheel. In accordance with the invention, at least one sensor is configured to generate an output indicative of a force applied by the second braking member to the first braking member.

In one embodiment, the at least one sensor comprises a load cell, strain gauge, force sensor or load sensor configured to sense a load, or force, applied thereto, and provide an output representative of the load or force applied thereto.

The braking mechanism may be of a variety of types. The braking mechanism may be a disc-type system in which the first braking member is a disc. In that embodiment, the second braking member is a brake pad.

In one embodiment, the sensor is associated with a pad plate or other member. The pad plate is, in turn, mounted to a backing plate instead of an actual brake pad. The at least one sensor is preferably mounted between the pad and the backing plate, such that when the brake pad is pressed into engagement with the rotor, the applied force is transmitted to the sensor for measurement. In another embodiment, the sensor is mounted to an actual brake pad or between an existing brake pad and its mount.

In one embodiment, the at least one sensor is configured transmit the output to a remote location. The sensor may include a wired and/or wireless transmitter. A sensor may be associated with the braking mechanism of one or more, including all, of the wheels of the vehicle.

In one embodiment, a system of the invention includes a processing unit configured to accept said input from each sensor and display brake force information in human readable form. The processing unit may include a video display for displaying brake force information in alpha-numeric, graphical or other form. The brake force information may comprise absolute brake force at one or more or all wheels, such as in a designated unit of measure, percentage of brake force or other brake force information.

In one embodiment, the processing unit may be configured to accept information from other sensors and display other information. For example, the unit may accept information from one or more wheel scales for displaying weight/mass information at one or more, including all, of the wheels of a vehicle. The unit may accept information from one or more caster/camber gauges or sensors for displaying caster/camber information regarding one or more, including all, of the wheels of a vehicle. In one embodiment, the unit includes at least one input to select a display mode, whereby a user may select the particular information for display (e.g. brake force, caster/camber or wheel scale information).

Various objects, features, and advantages of the present invention over the prior art will become apparent from the detailed description of the drawings which follows, when considered with the attached figures.

DETAILED DESCRIPTION OF THE INVENTION

The invention comprises methods and apparatus for determining and adjusting applied brake force in a braking system. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

In general, the invention comprises a method of determining applied brake force and, if desired, adjusting the brake force. Additional embodiments of the invention comprise apparatus, including a system, for determining and displaying brake force information.

The invention has particular applicability to brake systems utilized on vehicles, and most preferably, vehicles having both at least one front and rear wheel. Such vehicles include cars and trucks, including passenger and racing vehicles. The system may be used in a wide variety of other applications, such as with vehicles including motorcycles, airplanes, trains and other moving bodies.

The invention is useful with brake systems in which braking force is generated by moving two bodies into contact with one another. In one embodiment, movement is effectuated with a hydraulic force, such as applied liquid or gas (known generally as "air" or "fluid" braking systems), and in others it may be by direct mechanically applied force, such as via a linkage.

One environment of use of a method and apparatus/system of the invention will be described with reference to FIG. 1. As described below, the methods and apparatus/system of the invention may be used in other environments than that described.

Figure 1:
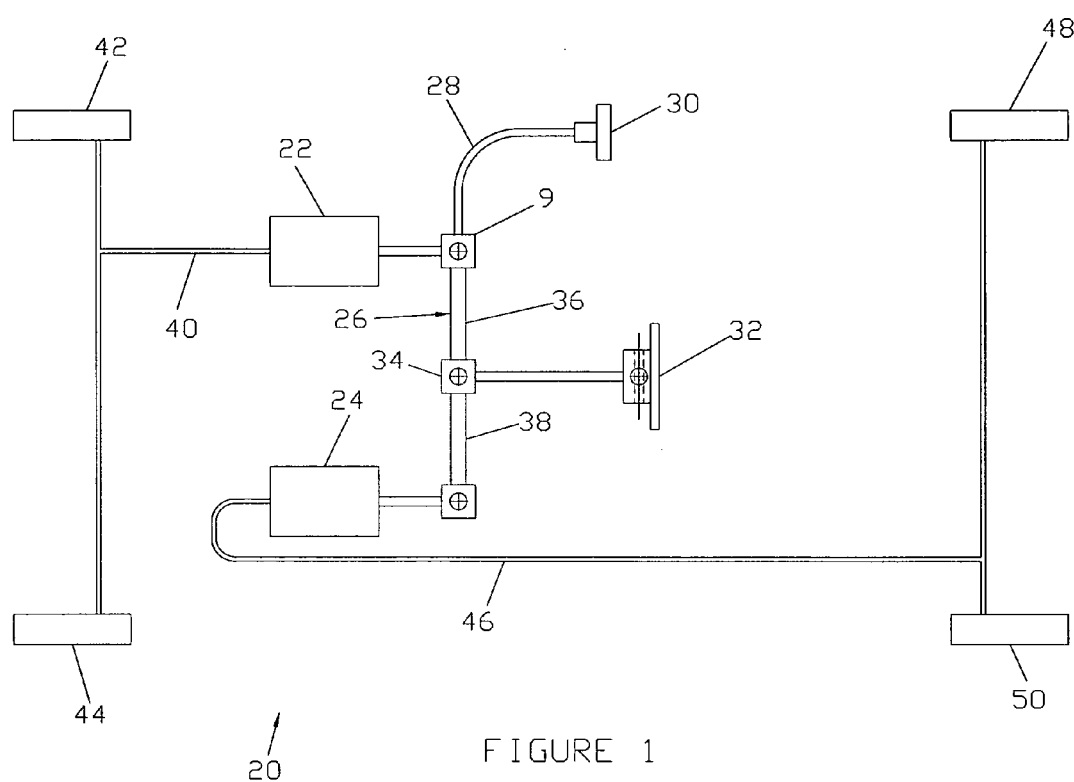
FIG. 1 illustrates one embodiment of a vehicle hydraulic brake system utilizing two master cylinders and a brake bias bar.

FIG. 1 shows one embodiment of a vehicle brake system 20. As illustrated, the brake system 20 is of a type which is often found on race cars. The system 20 consists of a front brake master cylinder 22 and a rear brake master cylinder 24 actuated by a threaded adjustable brake bias rod 26. As illustrated, the brake bias rod 26 actuates each of the front and rear brake master cylinders via a push rod or similar connection.

The brake bias rod 26 is, in turn, actuated by a brake pedal 32. In particular, when the brake pedal 32 is depressed, the brake bias rod 26 moves and acts upon the front and rear brake master cylinders 22, 24.

A point of activation 34 of the brake bias rod 26 by the brake pedal 32 is adjustable. In particular, the location of the point of activation 34 can be changed via rotation of the brake bias rod with a cable 28, as actuated by a knob 30. Preferably, the knob 30 is located inside a driver compartment of the vehicle, and thus is accessible to the driver.

When the knob 30 is turned by the driver, the driver changes the brake bias between the front and rear brakes of the race car. In particular, as the knob 30 is turned, the bias rod 26 rotates, changing its position. As the position of the brake bias rod 26 changes, so does the point of activation 34. As the point of activation 34 changes, so does the length of the brake bias bar 26 on each side of the point of activation. In particular, as illustrated, the brake bias bar 26 has a first portion 36 located between the point of activation 34 and the front brake master cylinder 22, and a second portion 38 which is located between the point of activation 34 and the rear brake master cylinder 24.

It will be appreciated that if the length of both portions 36, 38 of the brake bias rod 26 is the same, then the amount of force which is applied to the front and rear brake master cylinders 22,24 via the brake pedal 32, is equal. If the length of the first portion 36 is greater than the length of the second portion 38, then there is a decreased mechanical advantage and a lesser force applied to the front brake master cylinder 22 than the rear brake master cylinder 24. In this arrangement, the hydraulic pressure used to actuate the front brakes is less than that used to actuate the rear brakes. Alternatively, if the length of the second portion 38 is greater than the length of the first portion 36, then there is a decreased mechanical advantage and a lesser force applied to the rear brake master cylinder 24. In this arrangement, the hydraulic pressure used to actuate the rear brakes is less than that used to actuate the front brakes.

The front brake master cylinder 22 is connected by a fluid line 40 to a right front brake caliper 42 and a left front brake caliper 44. These calipers 42, 44 are preferably associated with braking mechanisms for the right and left front wheels of the vehicle.

Similarly, the rear brake master cylinder 24 is connected by a fluid line 46 to a right rear brake caliper 48 and a left rear brake caliper 50. These calipers 48, 50 are preferably associated with braking mechanisms for the right and left rear wheels of the vehicle.

As indicated, a wheel braking mechanism is preferably associated with one or more of the wheels of the vehicle. When the braking mechanism is activated, such as via hydraulic pressure transmitted by fluid through the brake lines, the braking mechanism is configured to impede the rotation of the wheel. In one embodiment, each wheel braking mechanism is a disc-type braking system which includes a caliper, a rotor and at least one pad. The pad is mounted to the caliper. The pad is mounted for movement towards and away from the rotor in response to hydraulic pressure. When the pad moves towards the rotor under applied hydraulic pressure, the pad presses upon the rotor. The rotor is preferably mounted to the wheel or a support for the wheel, such that braking of the rotor results in braking of the wheel.

It will be appreciated that the braking system may be configured in other ways than as described. For example, the braking system may be an air braking system. The mechanism for controlling the amount of pressure applied/generated by the master cylinders may vary, and need not comprise the brake bias rod configuration specifically described.

In general, the brake force measurement apparatus, method and system may have application to a variety of brake mechanisms having at least one first brake member associated with a rotatable wheel (or other member whose movement is to be inhibited) and at least one second brake member which is configured to engage the first brake member to inhibit relative movement between the members. As indicated, in a disc-brake system, the first brake member may comprise a rotor and the second brake member may comprise one or more brake pads. However, the invention has application to other types of brake systems, such as drum brake systems in which one brake member comprises a drum and another comprises one or more brake shoes for engaging the drum.

One embodiment of the invention is an apparatus and a method for measuring the braking force. In one embodiment, this apparatus preferably comprises means for measuring the force which is applied between two members of a brake mechanism. In one preferred embodiment, these members are a pad and a rotor. As described above, however, the members may be other elements.

Figures 2A, 2B:
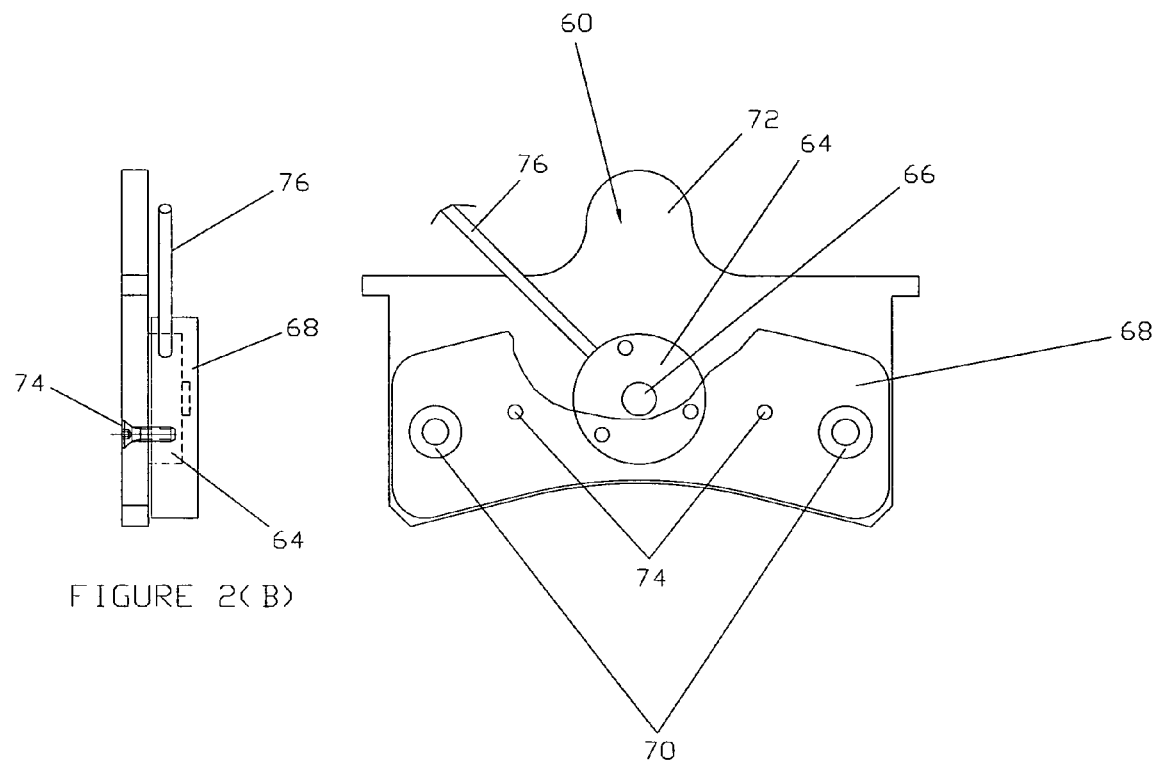
FIG. 2 is a cut-away view of the brake force measurement apparatus in accordance with an embodiment of the present invention.

Referring to FIGS. 2(*a*) and (*b*), in one embodiment, the means comprise a pressure sensor 60. In a preferred embodiment, the sensor 60 comprises a load cell 64 having a load cell button or contact 66. One such load sell is the model LBM-2K load cell manufactured by Interface of Scottsdale, Ariz. The sensor may be of a variety of other types, including a strain gauge or other force or load sensing device or element.

Preferably, the sensor 60 is associated with a brake pad, pad plate or other brake engaging member so that the sensor 60 can measure braking pressure or force applied by the braking mechanism. It will be appreciated that the configuration of the sensor 60, including how it is associated with the pad, pad plate or member, may vary.

FIGS. 2(*a*) and (*b*) illustrate one embodiment of a sensor mounting. In one embodiment, the sensor 60 is preferably associated with a pad plate or pad member 68. The pad plate 68 is, in one embodiment, not an actual brake pad, but simply comprises a mount for the sensor. Preferably, the pad plate 68 is similar in configuration to an actual brake pad, such as in shape/size, including surface area. In this manner, the pad plate 68 can be mounted in replacement of an actual pad when it is desired to measure brake force, and measured brake force as applied via the pad plate 68 is indicative of actual brake force applied via a real brake pad.

In one embodiment, the pad plate 68 has two recesses that guide pins 70. The pad plate 68 has a recess for the sensor 60 and floats freely on two guide pins 70. The pad plate 68 is secured to a support such as a backing plate 72 by two floating screws 74 that allow fro the free movement of the pad plate 68 over sensor 60 and, more particularly, the load cell button or contact 66. In this configuration, the sensor 60 is located in a first plane which is between a second plane in which the pad/pad plate 68 is located and a third plane in which the backing plate 72 is located (the planes extending generally parallel to one another). Thus, when the pad plate is moved into contact with the rotor (not shown), the applied pressure is translated through the pad/pad plate and the associated sensor 60 (and generally perpendicular to the planes in which those components are positioned) allowing the sensor 60 to directly sense applied break force.

The pad plate or other pad member to which the sensor 60 is connected may be constructed of a variety of materials. In the embodiment where the sensor 60 is associated with a pad plate or member other than a real brake pad, the pad plate or member is designed for static use and does not need to be constructed of the same material as an actual brake pad, since it is not used to actually brake the vehicle, but is simply a mount and force transmitting member. For example, the pad plate or member may comprise a steel plate.

In another embodiment, the sensor 60 of the invention may be mounted to an actual brake pad. In that event, the sensor 60 is preferably mounted to a back side of the brake pad or is otherwise positioned between the brake pad and its associated mounting, whereby braking force applied to the pad is transmitted to the sensor. If the sensor 60 is to be used to measure dynamic braking, i.e. braking while the vehicle is in motion, rather than "static" braking where the vehicle is not moving, then the sensor 60 must be associated with a real brake pad. In such event, it is desired that the sensor 60 be of a type which will withstand the high heat which such pads are subjected to during use.

It being understood that the sensor may be associated with a real brake pad or a substitute plate or member, the term "pad" or "pad member" as used herein may comprise either an actual brake pad or such a substitute member, unless otherwise indicated.

Obviously, if sensing is to be accomplished using a pad plate or member other than a real brake pad, the real brake pad is preferably removed and the pad plate and associated sensor are substituted. If a sensing is to be accomplished with a sensor associated with a real pad, if an existing pad is already associated with the braking mechanism, a new pad/sensor combination is substituted in its place or the sensor is mounted for use with that pad.

The sensor 60 is configured to output load information, in this case, information comprising or indicating applied brake force. In one embodiment, the sensor 60 includes a cable 76 by which information generated from the sensor 60 may be transmitted to another device or location. Of course, it will be appreciated that the information could be transmitted in other ways, such as wirelessly.

In accordance with this aspect of the invention, the actual braking or "clamping" force which occurs between the pad and rotor may be determined. As described below, this has numerous advantages.

Of course, a sensor 60 may be associated with the braking mechanism of one or more or all of the wheels of a vehicle, such as each of the four wheels of a vehicle. It will also be appreciated that the configuration of the sensor and/or pad may be other than as described above, depending on a number of factors, including the type of vehicle. For example, the sensor might be embedded in the pad or pad plate/member, mounted to the pad or pad plate/member in other manners than as described, or be otherwise supported.

Figure 3:
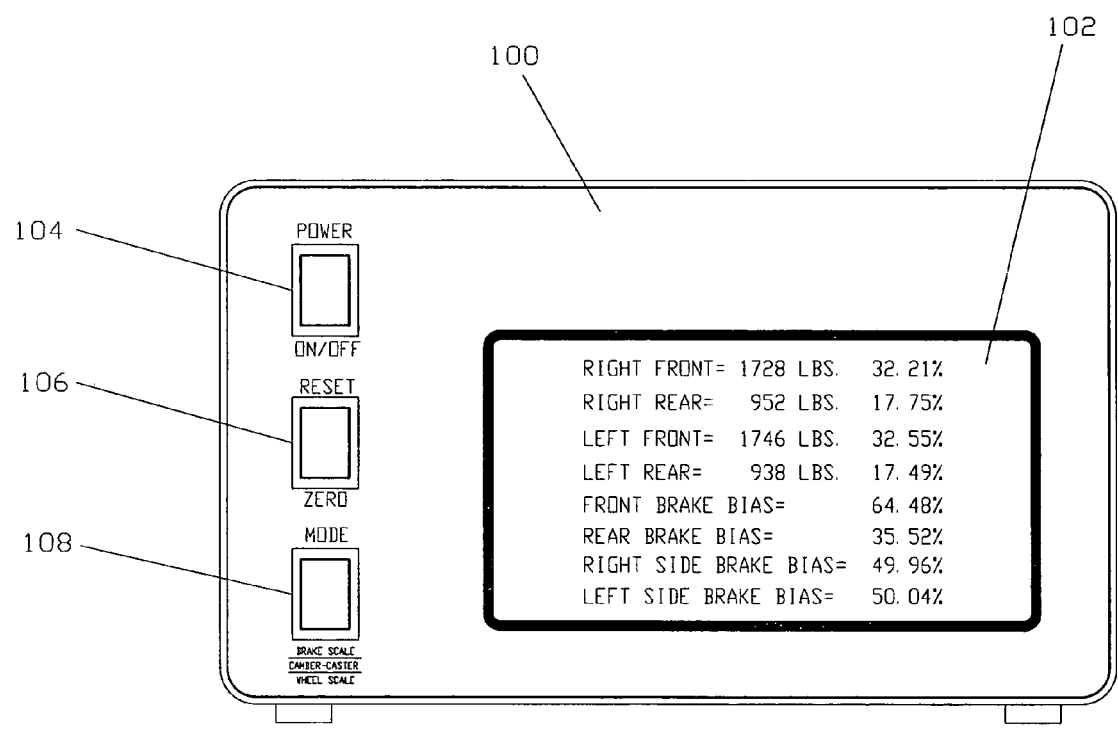
FIG. 3 is a front view of a processor/display unit of the present invention showing brake force readings.

One embodiment of the invention is a system for displaying and utilizing brake force information. FIG. 3 illustrates one embodiment of a processing unit 100 of such a system.

In one embodiment, the processing unit 100 is configured to obtain information from one or more of the brake force sensors 60 and to utilize that information, such as by generating information and/or displaying that information. As illustrated in FIG. 3, the unit 100 includes means for displaying information. As illustrated, this means comprises a display 102. The display 102 can utilize CRT, LCD, LED, OLED, VFD, plasma or other display technologies now known or later developed.

Figure 4:
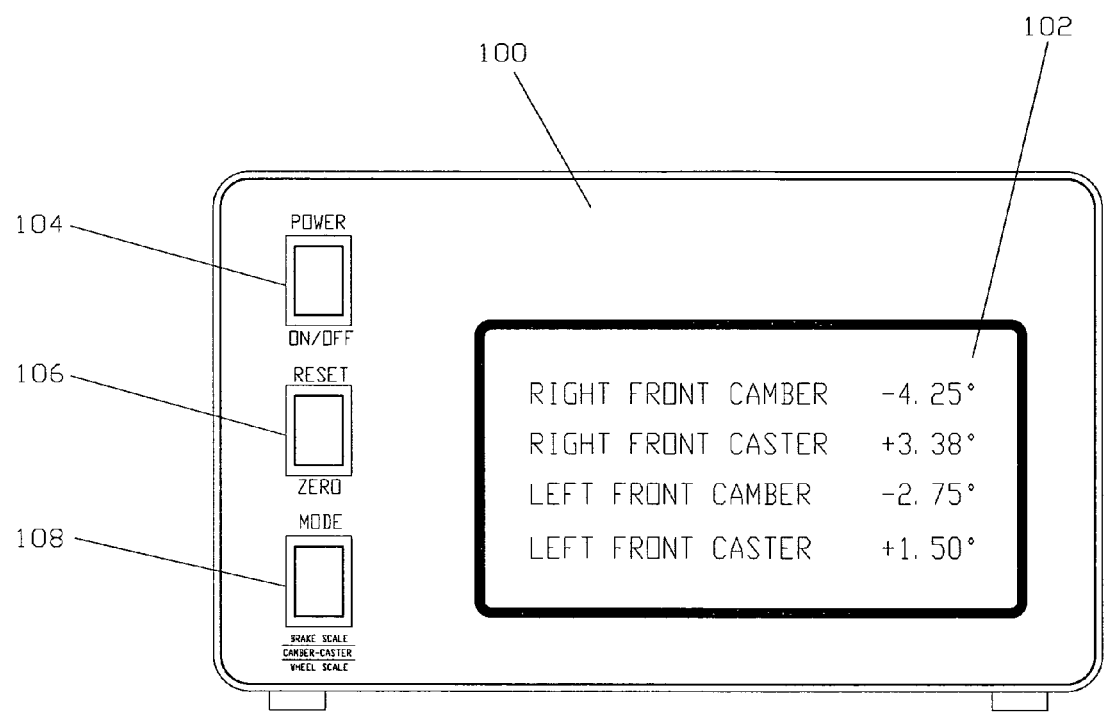
FIG. 4 is a front view of the processor/display unit of the present invention as configured to display camber-caster readings.
Figure 5:
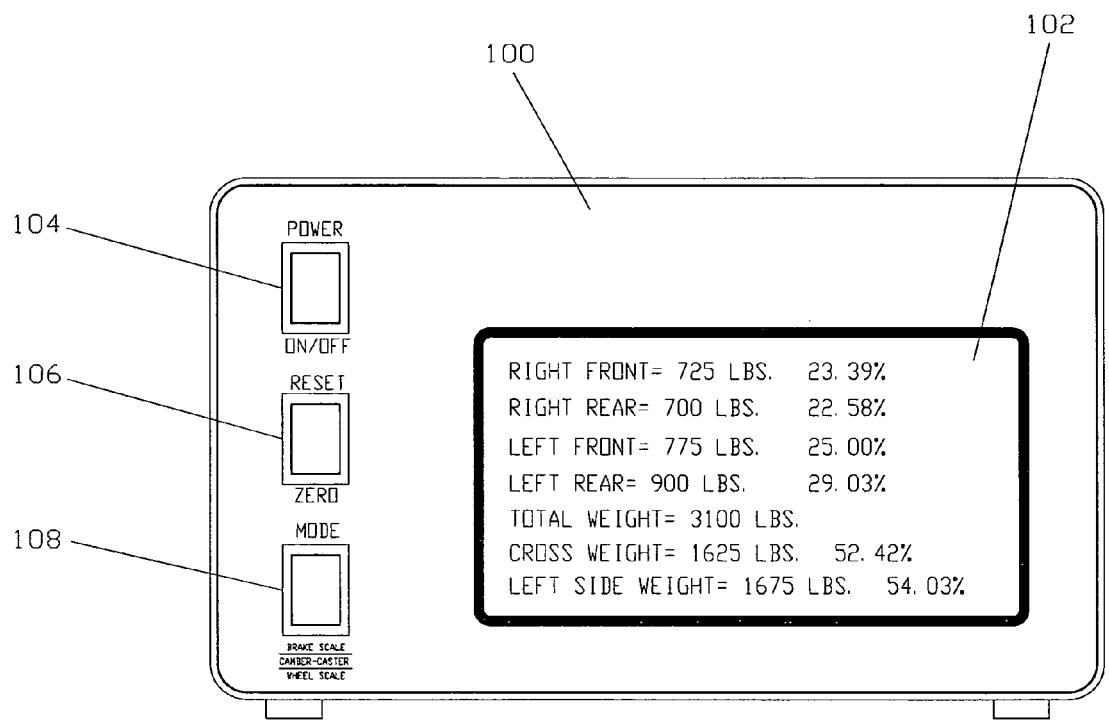
FIG. 5 is a front view of the processor/display unit of the present invention as configured to display wheel weight readings.

In one embodiment, the unit 100 includes a power switch 104, a reset/zero switch 106 to allow the resetting of any input sensors, such as a brake force sensor 60, and a mode switch 108. In one embodiment, the mode switch 32 allows the processor/display assembly 100 to function in different modes and display different information. For example, one mode may comprise a brake scale display mode in which brake force information is displayed, as illustrated in FIG. 3. Another mode may comprise a camber-caster gauge display mode in which camber and/or caster information is displayed, as illustrated in FIG. 4 (such information may be generated from a caster/camber sensor or measuring system, as disclosed in U.S. application Ser. No. 10/817,730, filed Apr. 2, 2004, which is incorporated herein by reference). Yet another mode may comprise a wheel scale display mode in which mass/weight information at one or more wheels is displayed, as illustrated in FIG. 5.

Of course, the unit 100 may include a variety of other elements. For example, the unit 100 may include a variety of other input devices. In one embodiment, the display 102 may comprise a touch screen device or other displays to allow for operator data and display input to the processor. Such an input device may eliminate the need for the reset/zero switch 106 and mode switch 108, for example, and also allow addition to other possible inputs and functions.

In accordance with the invention, the unit 100 is preferably configured to generate and display brake force information. This information may be displayed, as indicated, in a brake scale display mode. In one embodiment, in such a mode, the display 102 is configured to display information regarding the braking or clamping force of one or more of the brake mechanism. For example, the braking or clamping force in pounds or other units of measure at each wheel may be displayed. In one embodiment, the percentage of the total braking force of each brake mechanism comprising a multiple brake system may be displayed. For example, the front and rear brake bias may be displayed as a percentage of total brake force. In addition, right and/or left side brake bias may be displayed as a percentage of total brake force.

In one embodiment, the information is preferably displayed in alpha-numeric form. Of course, the manner of display of this information is not limited to such a configuration. Other display information or formats may be utilized. Graphs, pie-charts, bar charts and other graphical or color representations of the data derived from the sensors may be displayed.

As indicated, in one embodiment, the unit 100 may be configured to display caster and/or camber information. Referring to FIG. 4, the unit 100 may be configured to display such information from one or more caster and/or camber gauges or sensors, such as described above.

Referring to FIG. 5, and as indicated above, in one mode the unit 100 may be configured to display mass/weight information. In one embodiment, one or more wheels of the vehicle may be placed upon a scale configured to measure mass/weight. The scale may be configured to output mass/weight data for use by the unit 100 in displaying that information. In one embodiment, the scale may be configured to measure the mass of the entire vehicle. The scale may also be configured to measure the mass/weight at a single wheel. In this configuration, a scale may be provided corresponding to each wheel of the vehicle.

The unit 100 may be configured to display a variety of mass/weight information, depending upon the information provided by the one or more scales. For example, the unit 100 may display the total mass of the vehicle, the mass at one or all of the wheels, and/or the percentage of mass/weight at each wheel compared to the total mass, and/or the percentage of mass/weight at a combination of wheels compared to the total mass (such as the percentage of the mass of the vehicle at just the front wheels, at the rear wheels, or at combinations of the front and rear wheels.

Once again, this caster/camber and/or wheel scale/weight information may be displayed in a variety of manners, including by graphs, pie-charts, bar charts and other graphical or color representations. Further, the caster/camber gauges or sensors and wheel scales or sensor may employ a variety of technologies and may be configured to transmit data to the unit 100 by wired or wireless connections.

The unit 100 may be configured to received input from and display caster/camber and/or wheel scale/weight information from custom or proprietary devices specifically configured for use with the unit 100, such as the above-referenced caster/camber gauge. In addition, however, the unit 100 may be configured to receive input from third party devices, such as wheel scales or caster and/or camber measuring devices having a variety of different configurations, thus permitting the unit 100 to be "universal" in application, providing great flexibility to in use of the device. Thus, the unit 100 may be used with existing wheel scale and/or caster/camber sensors or those designed by other parties.

As but one example, the unit 100 may be configured to receive input from a DX-72634 Computerscales wheel scale system manufactured by Longacre Racing Products of Monroe, Wash. In such a configuration, output from sensors of such other systems or from a control unit of such systems may be input to the unit 100, thus allowing the unit 100 to manipulate and/or display provided information.

In another embodiment, information obtained by the sensor(s) 60 of the invention may be provided either directly or via unit 100 to the control unit of other systems for manipulation or display thereby. For example, in one embodiment, brake force information obtained by sensors 60 may be output to a control unit of the above-reference Computerscales wheel scale system for display thereby.

In these embodiments, the information may be routed between the components of the different systems directly (such as by plugging an output cable of the above-referenced Computerscales wheel scale system into the unit 100), or indirectly, such as through an interface which serves as a physical connector of the systems (such as a plug conversion) and/or serves to manipulate the information into a compatible format (such as by converting an analog output signal from a sensor into a digital signal which will be accepted by a control unit).

Figure 6:
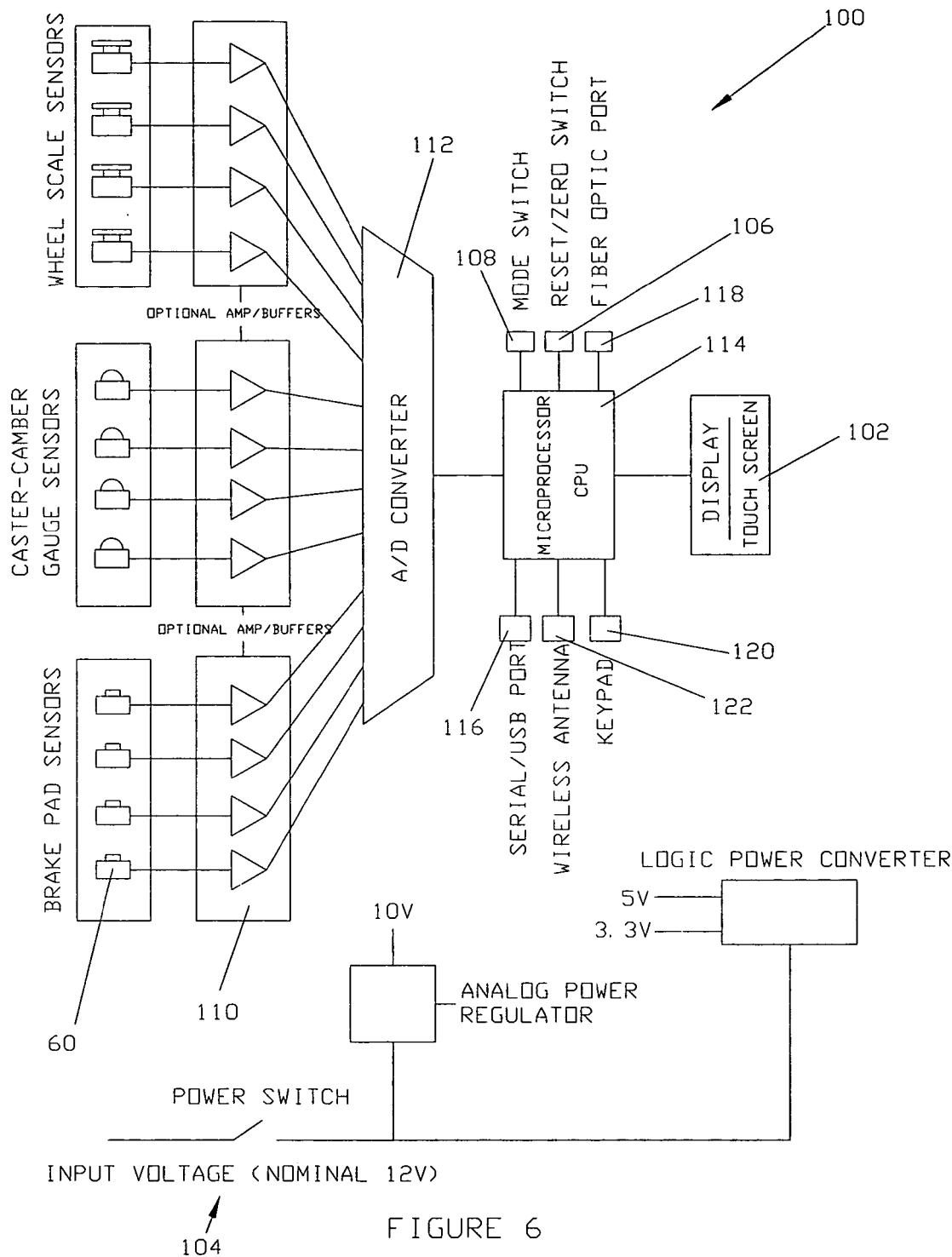
FIG. 6 is a block diagram of a processing/display unit in accordance with one embodiment of the present invention.

The unit 100 may have a variety of configurations. FIG. 6 is a block diagram illustrating one configuration of the unit 100. It will be appreciated that the unit 100 may have a variety of other configurations, including as dependent upon the desired functionality of the unit.

In one embodiment, unit 100 includes a plurality of inputs. These inputs accept an output from one or more sensors or other devices, such as the above-described brake force sensors 60, caster-camber gauge sensor(s) and wheel scale sensor(s). The inputs of the unit 100 may have a variety of configurations for accepting input from the sensors or other devices. In one embodiment, as illustrated, the unit 100 includes one or more analog to digital converters 112 for converting analog input signals to digital signals. The unit 100 may include one or more amplifiers 110 for converting differential analog inputs to single ended outputs and to scale the input levels to match a range of the analog to digital converter(s) 112. Of course, the unit 100 may also be configured to directly accept input of a digital signal.

In a preferred embodiment, the unit 100 includes a processor/cpu 114. The processor 114 may be of a variety of types, including standard commercially available microprocessors or micro controllers. It is noted that the analog to digital converter(s) may be integral to the processor 204, rather than separate therefrom as illustrated in FIG. 6.

The processor 114 preferably accepts the inputted information, such as the output of the brake sensor(s) 60, which represents the brake pressure, the output from the caster-camber gauge(s), which represents the angle of inclination of the level sensors, and/or the output of the brake scale sensor(s), which represents the mass/weight information. The processor 114 preferably converts that information to a format that can be read by the user. In this regard, the processor 114 may comprise hardware which is configured to accomplish such functions, or be configured to execute machine readable code (i.e. software) for performing those functions. As indicated above, the processor 114 may be configured to configure the inputted data into a variety of forms, such as alpha-numeric data, graphs, charts or the like. In addition, depending on the selected mode, the processor 114 may be configured to generate a variety of outputs, such as the above-described variations of braking force, percentage braking force, mass per wheel, percentage mass at one or more wheels or the like. In one embodiment, the processor 114 may be configured to convert the information based upon various units of measure, such as pounds/kilograms or the like.

The unit 100 preferably includes at least one display 102. As described above, the processor 204 is preferably configured to output data which displayed by the display 102. Of course, the unit 100 may be configured to output or display information in other ways. For example, the unit 100 may include an output for transmitting the information for display by an external display. The unit 100 might also include a printer or be configured to transmit the information to a printer for printing.

In one embodiment, the unit 100 includes one or more inputs. As indicated above, the inputs may comprise a power switch 104 for turning the device on and off, a mode switch 108 for toggling between the possible functions of the unit 100, and/or a reset/zero switch 106 used to remove the voltage offset present in an unloaded sensor to reset that sensor (of course, other methods may be utilized to reset or zero the sensor(s) and/or the unit 100).

In one embodiment, the unit 100 may include one or more output ports. In one embodiment, the output ports may include a serial and/or USB port 116 and/or a fiber optic port 118. The output ports may provide a link to an device such as an external computing device such as a desk-top computer or laptop, or a diagnostic computer. The serial port may be of a variety of types including TTL, RS232, and/or RS485. The one or more output ports may be of a variety of types, such as implementing USB, Ethernet or wireless protocols such as FireWire, Bluetooth and IEEE 802.11(xx). In the configuration of a wireless data port, the device may include an antennae 122.

Other inputs may be provided. As indicated, one input may comprise a touch-screen type display. Other inputs, such as a keyboard or keypad 120 may be provided.

In one embodiment, the unit 100 may include a data storage device such as a data mass storage device or a memory device. The data storage device may be utilized to store information when the unit 100 is shut off, or for purposes of comparing historical data to updated or new data. Of course, the size and type(s) of data storage may depend upon a number of factors including the amount of data which is to be stored.

Operation of the unit 100 will now be described. The output of the brake force sensors (and other sensors, such as caster/camber and wheel scale sensors, if applicable) is received by the unit and are preferably buffered, amplified, and/or level shifted by the buffer amplifiers, and passed on to the analog to digital converter. The analog to digital converter changes the analog output of the sensors to a digital representation of those voltages. That digital value is read by the processor and converted to a format that, when displayed or output by the unit, can be read by the user. Of course, if the input from the one or more sensors is already a digital signal, that input may be directly provided to the processor.

Preferably, the processor converts the output of the brake force sensors to pounds, ounces, kilograms, grams or other units of measure. If desired, the outputs of the brake force sensors may be displayed as a ratio, or a percentage, where the relationship of brake force at a plurality of the wheels is critical. The processor may be configured to perform similar functions relative to the input from the other sensors. For example, the processor preferably converts input from the caster/camber gauge(s) to an output in degrees or other units of measure.

In accordance with a method of the invention, the measured and obtained brake force information is utilized to adjust the brake system in order to control brake force. For example, it may be determined that the brake force applied to the front wheels is excessive (such as determined from a display of the measured and calculated brake force, in percentage, applied to the front as compared to the rear wheels). In such instance, the brake system may be adjusted, such as by changing the position of the brake bias bar, so as to change the braking force at the front and rear wheels.

Of course, similar adjustments could be made based upon the measured weight (from the wheels scale(s)) or caster/camber information.

The invention has numerous advantages. The invention provides a new and unique method and system for measuring the actual clamping or breaking force between two breaking members. In one embodiment, these members comprise at least one first breaking member, such as a rotor or drum, and atleast one second breaking member configured to engaged the first breaking member, such as one or more break pads. This clamping or breaking force maybe output in well known and recognized units of measure.

The method and system allows for the recording and diagnosis of vehicle brake bias settings and also for brake system and component diagnostics. In the case where the sensor is associated with a pad plate or member other than an actual brake pad, accurate brake force information can be obtained under static conditions. As indicated, such a pad plate or member preferably mimics the actual pad which will be used with the vehicle, including in total surface area, so that the sensor provided brake force information which reflect actual brake force generated by a real pad. In the case where the sensor is associated with a real brake pad, the sensor may be used to obtain static or dynamic brake force information. For example, in that case, the sensor may be used to measure actual braking force under conditions of use—i.e. when the vehicle is traveling and considering issues such as vehicle weight shift under braking, vehicle angle (such as on banked race tracks), and other factors.

In accordance with the method, apparatus and system of the invention, brake force information displayed instantly, in real-time, by the present invention. In addition, the information gathered may be downloaded either by wire or wireless methods for further analysis and recording.

One particular advantage of the invention is the direct measurement of braking force. This avoids the need, as in the prior art, for complex calculations and measurements which are attempts to derive brake force information from other measurements. For example, the invention overcomes the problems associated with simple measurement of hydraulic line pressure, in which additional complex measurement and calculation must be performed to derive brake force from fluid pressure.

As described above, brake bias is critical to the performance of race or high performance vehicles. Drivers spend much track practice and race time trying to optimize the bias setting through in-car adjustment methods. Race schedules require that teams return to certain tracks often during the race season. Once a brake bias setting is obtained for a certain track, it is advantageous to be able to understand what that setting is as a real number and be able to repeat it as a setup operation in the race shop prior to the team returning to that particular track again. The present invention provides a time-saving, repeatable method of recording the vehicle brake bias setting before and after a race, or during a practice session to help diagnose brake problems. The method provides for the ability to accurately set the previously established brake bias percentage number prior to a race. This method saves time and wear on the car, engine and tires by the driver not having a "dial-in" the brake bias percentage setting by trial and error. In operation, the use of temporary brake pad sensors that duplicate the exact shape and size of the brake pad being used, coupled to a processor and display provides the brake information. The brake pad sensors can be any shape or design that is currently utilized in the vehicle. It should be appreciated that the method can be utilized in any brake-equipped vehicle or device.

A further advantage of the present invention is the ability to diagnose brake caliper operation. As described above, it is advantageous to have calipers performing as matched sets to provide increased brake consistency and performance. The present invention allows race teams and brake caliper manufacturers to measure and record individual caliper clamping performance. This capability allows for the elimination of calipers that may be marginal due to manufacturing tolerances, warpage from heat experienced in competition, piston seal drag inconsistencies, damage, etc. In addition, the present invention is useful in the diagnosis of brake master cylinder problems as manifested in caliper operation. Prior art methods do not offer the ability to diagnose brake calipers and system components with the speed and accuracy of the described invention.

Additional embodiments of the invention allow not only for the measurement and recording of vehicle brake bias and brake component characteristics and settings, but also for other applications. The display and processor can be toggled to provide for four-wheel angle alignment input and display of the readings, as well as for four-wheel weight input and display of the readings. This ability allows for increased versatility and utility of the invention.

It will be understood that the above described arrangements of apparatus and the method there from are merely illustrative of applications of the principles of this invention and many other embodiments and modifications may be made without departing from the spirit and scope of the invention as defined in the claims.

What is claimed is:

1. A vehicle braking mechanism comprising:
   a first braking member associated with a rotatable wheel;
   a second braking member configured to move in and out of contact with said first braking member, said second braking member when in contact with said first braking member inhibiting the rotation of said rotatable wheel; and
   at least one sensor in contact with said second braking member, whereby when a braking force is applied by said second braking member to said first braking member, said second braking member compresses said at least one sensor and said at least one sensor generates an output indicative of a force applied by said second braking member to said first braking member.

2. The vehicle braking mechanism in accordance with claim 1 wherein said at least one sensor is selected from the group consisting of a load cell, a strain gauge, a force sensor and a load sensor.

3. The vehicle braking mechanism in accordance with claim 1 wherein said first braking member comprises a disc.

4. The vehicle braking mechanism in accordance with claim 1 wherein said second braking member comprises at least one brake pad.

5. The vehicle braking mechanism in accordance with claim 1 wherein said second braking member comprises a pad plate, said pad plate is mounted to a backing plate and said at least one sensor is located between said brake pad and said backing plate, such that force applied by said pad to said first braking member is transmitted to said at least one sensor.

6. The vehicle braking mechanism in accordance with claim I wherein said at least one sensor includes means for transmitting said output to a remote location.

7. The vehicle braking mechanism in accordance with claim 6 wherein said means comprises a wireless transmitter.

8. The vehicle braking system in accordance with claim 1, wherein said at least one sensor is located in a first plane which is located between a second plane containing said second braking member and a third plane containing a support to which said second braking member is mounted.

9. A braking force measurement system for a vehicle having one or more rotatable wheel comprising:
   a first braking member associated with at least one of said rotatable wheels;
   a second braking member configured to move in and out of contact with said first braking member, said second braking member when in contact with said first braking member inhibiting the rotation of said at least one rotatable wheel and said second braking mechanism is mounted to a support;
   at least one sensor positioned between said second breaking member and said support, whereby when a braking force is applied by said second braking member to said first braking mechanism, said second braking member compresses said at least one sensor and said at least one sensor generates an output indicative of a force applied by said second braking member to said first braking member; and
   a processing unit configured to accept said input from said at least one sensor and display brake force information in human readable form.

10. The braking force measurement system in accordance with claim 9 wherein said vehicle has four rotatable wheels and a first braking member, a second braking member and at least one sensor associated with each of said four rotatable wheels.

11. The braking force measurement system in accordance with claim 10 wherein said processing unit is configured to accept input from each of said sensors.

12. The braking force measurement system in accordance with claim 11 wherein said processing unit is configured to display information selected from the group consisting of one or more of: the brake force applied at any one rotatable wheel, the brake force applied at multiple of said rotatable wheels, and a percentage brake force applied at anyone rotatable wheel compared to the brake force applied at multiple of said rotatable wheels.

13. The braking force measurement system in accordance with claim 9 wherein said processing unit includes a video display configured to display said brake force information.

14. The braking force measurement system in accordance with claim 9 wherein one or more of said sensors include a wireless transmitter configured to transmit said output and said processing unit includes a wireless receiver configured to receive said output.

15. The braking force measurement system in accordance with claim 9 wherein said at least one sensor is selected from the group consisting of a load cell, a strain gauge, a force sensor and a load sensor.

16. The vehicle braking mechanism in accordance with claim 9 wherein said second braking mechanism comprises at least one brake pad which is mounted to a backing plate and said at least one sensor is located between said at least one brake pad and said backing plate.

* * * * *